Oct. 18, 1955    L. A. DAUNCEY ET AL    2,721,209
METHODS OF GROWING CRYSTALS
Filed May 21, 1951
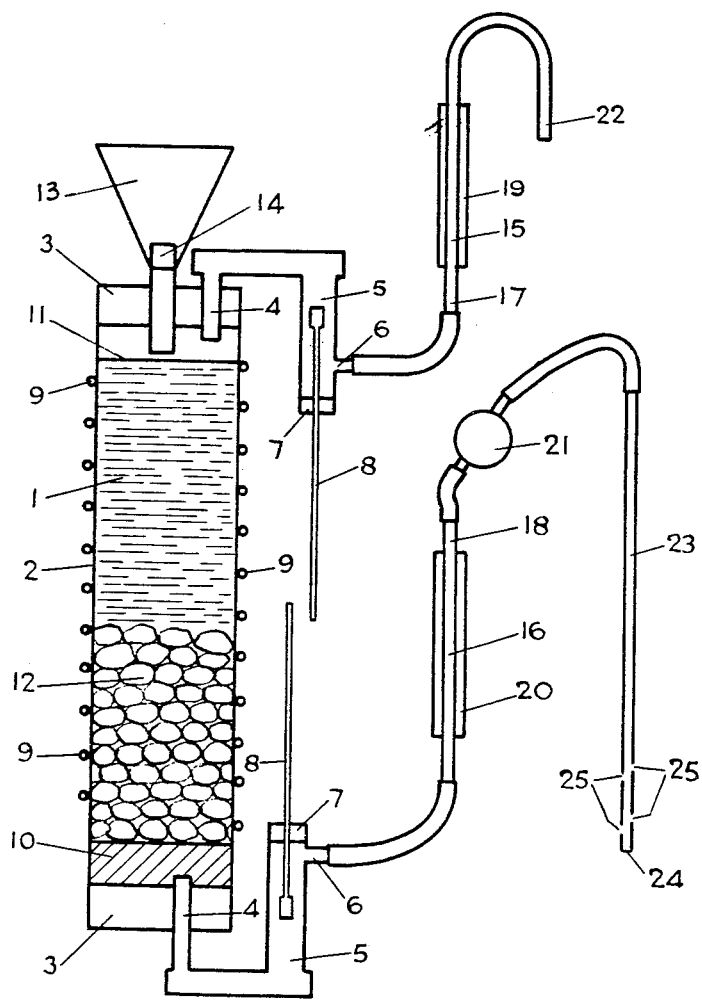
INVENTORS
LEONARD ARTHUR DAUNCEY
JOHN ERROL STILL
BY
ATTORNEY

United States Patent Office 2,721,209
Patented Oct. 18, 1955

2,721,209

METHODS OF GROWING CRYSTALS

Leonard Arthur Dauncey and John Errol Still, Wembley, England, assignors to The General Electric Company Limited, London, England Application May 21, 1951, Serial No. 227,322

Claims priority, application Great Britain May 22, 1950

7 Claims. (Cl. 260—501)

This invention relates to methods of growing crystals.

Methods of growing crystals are known in which seed crystals are mounted in a tank containing a supersaturated solution of the crystalline material and, as the material is deposited on the seed crystals, the temperature of the solution is gradually lowered to maintain it in a supersaturated condition provided that the solubility/temperature coefficient of the material is positive. If the solubility/temperature coefficient is negative, the temperature of the solution has to be raised to maintain it in a supersaturated condition. In many cases relative movement is imparted between the seed crystals and the solution in the tank. Such crystal growing methods are sometimes known as falling or rising temperature methods, as the case may be.

One disadvantage of the falling or rising temperature methods is that where the temperature range, over which crystallization may be carried out, is limited, as for example by the instability of a solution of the crystalline material above a certain temperature, the size and number of crystals which may be grown is correspondingly limited to the amount of material which may be deposited from the initial solution while its temperature falls or rises over the permissible temperature range.

Apparatus for growing crystals, using a method in which this disadvantage may be overcome, is described in our co-pending United States patent application Serial No. 227,323, filed May 21, 1951, for "Apparatus for Use in Growing Crystals," now abandoned. The tank solution is maintained at a constant temperature and is circulated continuously at a temperature at which the tank solution would be unsaturated through a recharging column containing solid solute material, in order to maintain the tank solution supersaturated despite the continuous deposition of the solute on the crystals. Where however it is desired to operate a number of small crystal growing tanks, it may not be economic to provide recharging apparatus to enable each of them to be operated as a constant temperature tank.

It is an object of the present invention to provide a method of growing crystals by a falling or rising temperature method using only a limited range of temperature fall or rise.

It is a further object of the present invetnion to provide a method of growing crystals which may conveniently be carried out simultaneously in a number of crystal growing tanks with economy of apparatus.

According to the present invention a method of growing crystals of a given material comprises the step of immersing seed crystals of the material in a supersaturated solution of the material at a temperature within a predetermined range of temperatures and near one limit of that range and the steps, which are repeated cyclically until the crystals have grown to the required size, of causing or allowing the temperature of the solution to alter, so that it remains supersaturated and there is deposition of solute on the crystals, from the said temperature to a further temperature in the said range and near the other limit thereof and of causing or allowing the temperature of the solution to alter from the further temperature to a temperature in the said range and near the one limit thereof, whilst maintaining the solution supersaturated by circulating it through recharging apparatus in which it passes over solid solute material at a temperature in a predetermined relation to the saturation temperature of the bulk of the solution, thereby increasing its concentration.

Preferably the second of the two steps which are repeated cyclically, is carried out in a much shorter time than the first of the said two steps.

If the material has a positive solubility/temperature coefficient, the said one limit of the predetermined range of temperatures will be the upper limit, the said other limit will be the lower limit, and the said predetermined relation will be such that the solution passes over solid solute material at a temperature greater than the saturation temperature of the bulk of the solution. If the material has a negative solubility/temperature coefficient, the said one limit will be the lower limit, the said other limit will be the upper limit and the said predetermined relation will be such that the solution passes over solid solute material at a temperature less than the saturation temperature of the bulk of the solution.

Preferably the recharging apparatus comprises, a recharging column, in the form of a length of wide bore tubing closed except for a liquid inlet, a liquid outlet and an inlet to enable solid material to be discharged when required into the column and said column having means provided to prevent the escape of solid material through either the inlet or the outlet, a heater for controlling the temperature of the column, a first auxiliary solution heater for controlling the temperature of the solution entering the column, a second auxiliary solution heater for controlling the temperature of the solution leaving the apparatus and a pump for circulating the solution through the recharging apparatus.

According to a feature of the present invention the recharging apparatus is connected to the apparatus in which the crystals are grown, only during the steps in which the temperature of the solution is caused or allowed to decrease or increase from a temperature near the said other limit to a temperature near the said one limit of the said range of temperatures. If crystals are grown simultaneously in a number of tanks, one recharging apparatus may be employed for use with each tank in turn during the appropriate steps, and may be mounted on a mobile stand for movement between the several tanks.

One method according to the present invention as applied to the growth of ethylene diamine tartrate crystals from aqueous solutions thereof will now be described by way of example with reference to the accompanying drawing which shows a diagram of one form of recharging apparatus.

It is found that there are two factors which limit the temperature range over which a falling temperature crystal growing tank may be operated for the growth of ethylene diamine tartrate crystals suitable for cutting for use in piezo-electric units. A lower limit is imposed by the fact that below approximately 41° C. ethylene diamine tartrate monohydrate is the stable crystalline form instead of the anhydrous form. Thus if a tank is operated at a temperature much below 41° C. there is liability of deposition of the monohydrate rather than the anhydrous form. An upper limit is imposed by the fact that if a solution of ethylene diamine tartrate is maintained for long at temperatures above about 50° C. the viscosity of the solution increases rapidly due possibly to the formation of another compound. It is therefore desirable to limit the temperature range over which a falling temperature tank is operated to approximately the range 41° C.–50° C.

In consequence of this limitation it is not possible in one falling-temperature run to grow a sufficient number of large crystals to make the process economic and it becomes desirable to use a method according to the present invention whereby when the temperature has reached the lower limit of the range, the temperature of the solution is raised again to the upper limit in a relatively short time, at the same time increasing the concentration of the solution so that it is maintained in a supersaturated condition. This process may be repeated cyclically until the crystals have grown to a sufficient size.

To increase the concentration o fthe solution in a crystal growing tank whilst its temperature is being raised, it is circulated from the tank through recharging apparatus in which its temperature is raised above the saturation temperature of the bulk of the solution in the tank before it is passed through a column kept nearly filled with solid ethylene diamine tartrate, and then back into the crystal growing tank.

The recharging apparatus is substantially the same as that used in the apparatus for growing crystals in a constant temperature supersaturated solution described in our aforesaid United States Patent application Serial No. 227,323 but on a smaller scale. The recharging apparatus which is shown diagrammatically in Figure 1 of the accompanying drawings, comprises a recharging column 1 in the form of a wide bore glass tube 2 of about three inches diameter and about two feet long, which in operation is held with its longitudinal axis approximately vertical. The column 1 is closed at both ends by rubber bungs 3, through each of which passes a stainless steel inlet or outlet tube 4 of about a quarter of an inch bore. Each inlet or outlet tube 4 is one upright arm of a U-tube, the other upright arm 5 of which projects back parallel to the column 1 and has a side-arm 6 near its free end. The free end is closed by a bung 7 through which a thermometer 8 projects into the tube 5. The side arms 6 are used to connect the recharging column 1 with other parts of the apparatus.

The neck of a funnel 13, through which crushed solid ethylene diamine tartrate 12 may be introduced into the recharging column 1, also passes centrally through the upper rubber bung 3. The neck of the funnel is approximately one inch in diameter and projects about one inch below the inner face of the upper bung 3. It is normally blocked by a further bung 14. A heating coil 9 of 20 S. W. G. Nichrome wire is wound on the outside of the recharging column 1, in the form of a helix having a pitch of one centimetre. The coil 9 is supplied with alternating current from the secondary of a step down transformer of which the primary is connected to the output of a variable auto-transformer connected across an A. C. mains supply of 200–250 volts, the maximum voltage applied to the coil 9 by the arrangement being approximately 60 volts. (The electrical connections and transformers are not shown in the drawing.)

In operation the solution circulating through the recharging apparatus may be passed either downwards or upwards through the recharging column 1. In the first case, which is preferred, the bottom of the column 1 is packed with cotton wool 10 to act as a filter for the solution leaving the column 1, and the column is run with the liquid level 11 below the end of the liquid inlet tube 4 so that no filter is necessary at the top of the column 1. The cotton wool may be retained for convenience between a pair of perforated plastic discs. In the second case (which is not shown in the drawing) the solid 12 is prevented from leaving the bottom of the column 1 by a piece of 200 mesh stainless steel gauze, and the annular space round the neck of the funnel 7 inside the column 1 is packed with cotton wool to act as a filter for solution leaving the column 1.

Two auxiliary solution heaters 15 and 16 are connected into the solution circuit, solution heater 15 before the recharging column 1 and solution heater 16 after it. The solution heater 15 acts to control the temperature of the solution entering the column 1 and the solution heater 16 to control the temperature of the solution as it is returned to the crystal growing tank. Each solution heater 15 or 16 consists simply of a length of glass tube 17 or 18 of about ⅜ of an inch diameter, about nine inches of the length of which is closely wound with a coil 19 or 20 of 0.01 inch diameter Nichrome wire. Each coil 19 and 20 is connected across the output of a separate variable auto-transformer supplied from an A. C. mains supply of 200–250 volts.

A pump 21 is provided to circulate the solution from the tank through the recharging apparatus and back to the tank. This may be any suitable form capable of displacing about 10 litres of solution an hour. The pump 21 should preferably have as smooth a liquid channel as possible so that there are no pockets in which solution might collect and crystallize.

Solution is drawn from the crystal growing tank through a glass tube 22 which is inserted to project about an inch below the surface of the solution from above. The glass tube 22 is the free end of a U-shaped extension of the glass tube 17 of the solution heater 15, which when the tube 22 is inserted in the tank, projects downwards outside the wall of the tank. It is necessary that the first solution heater 15 should be placed in the liquid circuit near the tank and be connected to it by as smooth a path as possible, in order that the supersaturated solution drawn from the tank shall have as little chance as possible to crystallize, before its temperature is raised above the saturation temperature by the first solution heater 15.

The lower end of the tube 17 of the first solution heater 15 is connected by tubing to the side arm 6 of one of the U-tubes on the recharging column 1. The particular one depends on the direction in which the solution is passed through the column 1 and if solution is passed downwards through the column 1 it is connected to that of the upper U-tube as shown in Figure 1. If solution is passed upwards through the column 1 the connections to it are reversed. The remainder of this description refers to circulation downwards through the column 1. The lower end of the second solution heater 16 which is held approximately vertically, is connected by tubing to the side arm 6 of the lower U-tube. The upper end of the second solution heater is connected by tubing to the intake of the pump 21 and the discharge from the pump 21 is returned to the tank through a length of tubing 23 of heat insulating plastic preferably of the kind sold under the registered trademark "Tufnol," which is inserted to project almost to the bottom of the solution in the tank. The said plastic material is preferred for the return tube 23, as its heat insulating properties reduce the evaporation and consequent crystallization which may occur where the return tube 23 passes through the surface of the solution in the tank. The end 24 of the return tube 23 is sealed and small outlet holes 25 are made in the walls, which holes are arranged so that the stream of liquid issuing from them does not impinge directly on the growing crystals in the tank. A thermometer well is provided between the pump and the return tube, so that the temperature of the solution returning to the tank may be checked.

One method of operating the apparatus described above is as follows. When the falling temperature crystal growing tank reaches a temperature of about 41° C., a process which may take between 10 and 40 days starting from 50° C., the recharging apparatus with column 1 already filled with ethylene diamine tartrate solution and solid as described below is connected up to the tank by inserting the tubes 22 and 23, and since, during the operation of raising the temperature and saturation temperature of the solution, it is necessary to observe the saturation temperature of the tank solution continuously the saturation temperature measurement apparatus described in pending U. S. patent application, Serial No. 227,324 is also connected up to the solution in the tank and is set in operation.

The pump 21 is set in operation and the variable auto-transformer controls for the heating coil 9 and the first solution heaters 15 are turned up to apply the maximum voltages. The second solution heater 16 is adjusted so that the solution temperature on returning the tank is approximately the same as that when leaving the recharging column 1. If the tank is, as is usual, provided with an automatic temperature regulator, this is disconnected and a hand control substituted.

Initially the conditions in the tank are for example, solution temperature 41° C. and solution saturation temperature 43° C. The variable transformer controls are adjusted after commencement of the operation so that at first the temperature of the solution in the column 1 is 10-15° C. above that of the bulk of the solution in the tank, the saturation temperature of the solution returning to the tank being under those conditions 5-10° C. above the temperature of the bulk of the solution in the tank. The saturation temperature of the bulk of the solution in the tank is read continuously, and the tank heater adjusted to maintain the temperature about 2° C. below the saturation temperature. It may be found at first that the increased temperature of the solution returning to the tank is sufficient to raise the temperature of the bulk of the solution as required and the tank heater may be switched off. As the temperature of the bulk of the tank solution approaches near to 50° C., the variable auto-transformer controls for the heating coil 9 and first solution heaters 15 are gradually turned down until the solution circulates through the apparatus at tank temperature throughout. The tank solution would then for example be at a temperature of 50° C. and have a saturation temperature of 52° C. When the conditions are sufficiently stable the resaturation apparatus and saturation temperature measurement apparatus are stopped and disconnected from the tank, and the tank is returned to the control of the automatic temperature regulator and allowed to proceed on a normal falling-temperature run. When the tank temperature again reaches about 41° C. the process is repeated, and so on until the crystals have grown to the required size.

During the process described in the previous paragraph, additional solid ethylene diamine tartrate is discharged into the recharging column 1 through the funnel 7 as required at regular intervals, the first solution heater 15 being switched off and the bung 8 removed from the funnel for that purpose.

It has been found that the temperature of the solution in a 20-litre capacity crystal growing tank may safely be raised in the manner described at a rate of 3° C. to 4° C. per hour, the step of raising the temperature from 41° C.–50° C. therefore taking a few hours.

The methods according to the invention are particularly advantageous where a number of similar crystal growing tanks are operated simultaneously, as it may be arranged that one set of recharging apparatus is used to effect the raising of the temperature of each tank in turn. For this purpose the recharging apparatus with its control apparatus may be suitably mounted on a wheeled trolley for removal from one tank to the next.

It is convenient that in the intervals between use in raising the temperature of a tank the recharging apparatus may be kept filled with solution and with solid ethylene diamine tartrate and that the pump 21 and heaters 9, 15 and 16 may be kept in operation, in order to avoid the crystallization of solid in the pump 21 and the various connecting tubes, which would otherwise occur and which would necessitate the cleaning of the whole apparatus. This may be conveniently effected by placing the ends of the tubes 22 and 23 of the recharging apparatus after removal from a tank under the surface of ethylene diamine tartrate solution in a 400 millilitre beaker, which is clamped to the same stand or trolley as the recharging apparatus itself. The recharging apparatus is kept operating with the variable auto-transformer controls set so that the column temperature is at some suitable temperature between 40° C. and 50° C., while the temperature of the solution in the pump, tubes, and beaker is 2° or 3° C. higher. An inch layer of water is run on to the surface of the solution in the beaker, and a rubber sheet cover is used to restrict evaporation from the beaker. The water layer will persist for about a week in operation and effectively prevents the formation of crystal nuclei in the beaker. In this way the recharging apparatus is maintained filled with solution under conditions of temperature etc. near to those under which it is operated.

It may be stated that using the method described above it has been found possible to operate simultaneously eight 20-litre falling temperature tanks each growing eight large ethylene diamine tartrate crystals. In the process of growing crystals having dimensions about 6" x 3" x 2" each tank underwent the recharging process two or three times.

It will be appreciated that the methods according to the invention are not limited in their application to the growth of ethylene diamine tartrate crystals, but by suitably modifying the apparatus and temperatures of operation etc., the methods may equally be applied to the growth of other crystals. In particular, where it is required to grow crystals of a substance such as lithium sulphate having a negative temperature/solubility coefficient, the tank would be a rising temperature tank, the recharging apparatus would be used to lower the temperature of the solution in the tank, and the recharging column temperature would have to be lower than the saturation temperature of the bulk of the solution in the tank.

We claim:

1. A method of growing crystals of a given material comprising the first step of immersing seed crystals of the material in a body of supersaturated solution of the material at a temperature within a predetermined temperature range between a first limit and a second limit and nearer the first limit of said range at which the solubility of the material is greater, the second step of controlling the temperature of the body of solution so that it alters gradually from said temperature to a different temperature within said range nearer the second limit, the temperature being controlled during the second step so that the solution remains supersaturated as the solute material is deposited as crystalline growth on the seed crystals, the third step of controlling the temperature of the body of solution so that it alters from said different temperature to a temperature nearer said first limit, the concentration of the solution being increased during the third step to maintain it supersaturated, by connecting recharging apparatus to the body of solution and circulating the solution through said apparatus in which it passes over solid solute material at a temperature at which the solubility of the material is greater than it is at the saturation temperature of the body of solution, and the further steps of repeating the said second and third steps in that order until the crystals have grown to the required size.

2. A method according to claim 1 in which the said third step, and the repetitions thereof are carried out in a much shorter time than the said second step and the repetitions thereof.

3. A method according to claim 1 in which during the third step and the repetitions thereof, the saturation temperature of the body of solution is measured continuously and compared with its temperature.

4. A method of growing crystals of a given material from a supersaturated solution, the material and the solvent being such that the solubility of the material in the solvent increases with temperature, comprising the first step of immersing seed crystals of the material in a body of supersaturated solution of the material at a temperature near and within the upper limit of a predetermined range of temperatures, the second step of controlling the temperature of the body of solution so that it decreases gradually from the said temperature to a different temperature near the lower limit of the said range, the temperature being controlled so that the solution remains supersaturated as the material is deposited as crystalline growth on the seed crystals, the third step of controlling the temperature of the body of solution so that it increases from the said different temperature to a temperature near the upper limit of the said range, the concentration of the solution being increased during the third step to maintain it supersaturated by connecting recharging apparatus to the body of solution and circulating the solution through the apparatus in which it passes over solid solute material at a temperature higher than the saturation temperature of the body of solution, and the further steps of repeating the said second and third steps in that order until the crystals have grown to the required size.

5. A method of growing crystals of a given material from a supersaturated solution, the material and the solvent being such that the solubility of the material in the solvent decreases with temperature, comprising the the first step of immersing seed crystals of the material in a body of supersaturated solution of the material at a temperature near and within the lower limit of a predetermined range of temperatures, the second step of controlling the temperature of the body of solution so that it increases gradually from the said temperature to a different temperature near the upper limit of the said range, the temperature being controlled so that the solution remains supersaturated as the material is deposited as crystalline growth on the seed crystals, the third step of controlling the temperature of the body of solution so that it decreases from the said different temperature to a temperature near the lower limit of the said range, the concentration of the solution being increased during the third step to maintain it supersaturated by connecting recharging apparatus to the body of solution and circulating the solution through the apparatus in which it passes over solid solute material at a temperature lower than the saturation temperature of the body of solution, and the further steps of repeating the said second and third steps in that order until the crystals have grown to the required size.

6. A method of growing crystals of anhydrous ethylene diamine tartrate from a supersaturated aqueous solution comprising the first step of immersing seed crystals of anhydrous ethylene diamine tartrate in a body of supersaturated aqueous solution at a temperature within and near the upper limit of the range 40° C. to 52° C., the second step of controlling the temperature of the body of solution so that it decreases gradually from the said temperature to a different temperature within the said range near the lower limit, the temperature being controlled so that the solution remains supersaturated as crystalline anhydrous ethylene diamine tartrate is deposited on the seed crystals, the third step of controlling the temperature of the body of solution so that it increases from the said different temperature to a temperature near the upper limit of the said range, the concentration of the solution being increased during the third step to maintain it supersaturated by connecting recharging apparatus to the body of solution and circulating the solution through the apparatus in which it passes over solid ethylene diamine tartrate at a temperature between 3° C. and 10° C. higher than the saturation temperature of the body of solution, and the further steps of repeating the said second and third steps in that order until the crystals have grown to the required size.

7. A method of growing crystals of a given material from a supersaturated solution in a number of different containers simultaneously comprising the first step if immersing seed crystals of the material in a body of supersaturated solution in each container at a temperature within a predetermined range of temperatures and nearer the one limit of that range at which the solubility of the material is greater, the second step of controlling the temperature of the body of solution in each of the containers independently so that it alters gradually from the said temperature to a different temperature within said range nearer the other limit, the temperature in each container being controlled during the second step so that the solution remains supersaturated as the solute material is deposited as crystalline growth on the seed crystals, the third step of connecting recharging apparatus to the body of solution in a first one of the containers, controlling the temperature of the body of solution so that it alters from the said different temperature to a temperature nearer and within the said one limit of the said range, the concentration of the solution being increased to maintain it supersaturated, by circulating it through the recharging apparatus in which it passes over solid solute material at a temperature at which the solubility of the material is greater than it is at the saturation temperature of the solution in that one container, disconnecting the recharging apparatus and subsequently carrying out with said one container a step similar to the second step, the further steps of carrying out the third step for each of said containers in turn using the same recharging apparatus, and repeating the third step with each container when the solution within it again reaches a temperature near and within the said other limit of said range, as many times as is required to grow crystals of the desired size.

References Cited in the file of this patent
UNITED STATES PATENTS

| | | |
|---|---|---|
| Re. 19,697 | Kjellgren | Sept. 10, 1935 |
| 2,204,180 | Gerlach | June 11, 1940 |
| 2,219,776 | Henderson | Oct. 29, 1940 |
| 2,459,869 | Christensen | Jan. 25, 1949 |
| 2,472,303 | Malone | June 7, 1949 |
| 2,484,829 | Holder | Oct. 18, 1949 |
| 2,562,325 | Merritt | July 31, 1951 |
| 2,604,385 | Chambers | July 22, 1952 |